United States Patent
Tomita et al.

(10) Patent No.: US 12,362,420 B2
(45) Date of Patent: Jul. 15, 2025

(54) SUPPORT MEMBER AND BATTERY MODULE

(71) Applicant: MEKTEC CORPORATION, Tokyo (JP)

(72) Inventors: Shunsuke Tomita, Tokyo (JP); Tomoki Kanayama, Tokyo (JP)

(73) Assignee: MEKTEC CORPORATION, Tokyo (JP)

( * ) Notice: Subject to any disclaimer, the term of this patent is extended or adjusted under 35 U.S.C. 154(b) by 979 days.

(21) Appl. No.: 17/276,084

(22) PCT Filed: Sep. 3, 2019

(86) PCT No.: PCT/JP2019/034514
§ 371 (c)(1),
(2) Date: Mar. 12, 2021

(87) PCT Pub. No.: WO2020/105244
PCT Pub. Date: May 28, 2020

(65) Prior Publication Data
US 2022/0045396 A1 Feb. 10, 2022

(30) Foreign Application Priority Data

Nov. 20, 2018 (JP) .................................. 2018-217528

(51) Int. Cl.
*H01M 50/242* (2021.01)
*H01M 50/209* (2021.01)
(Continued)

(52) U.S. Cl.
CPC ....... *H01M 50/242* (2021.01); *H01M 50/209* (2021.01); *H01M 50/287* (2021.01); *H01M 50/50* (2021.01)

(58) Field of Classification Search
CPC . H01M 50/242; H01M 50/209; H01M 50/287
See application file for complete search history.

(56) References Cited

U.S. PATENT DOCUMENTS 9,150,115 B2 10/2015 Ikeda et al.
9,666,840 B2 5/2017 Sakai et al.
(Continued)

FOREIGN PATENT DOCUMENTS

CN 102868126 A 1/2013
CN 103620822 A 3/2014
(Continued)

OTHER PUBLICATIONS

An Office Action mailed by the China National Intellectual Property Administration on Sep. 9, 2022, which corresponds to Chinese Patent Application No. 201980052834.8 and is related to U.S. Appl. No. 17/276,084; with English translation.
(Continued)

*Primary Examiner* — Sadie White
*Assistant Examiner* — Kayla Elaine Clary
(74) *Attorney, Agent, or Firm* — Studebaker Brackett PLLC (57) ABSTRACT

Provided are a support member and a battery module in consideration of variations in dimensions of the battery. At the same time, stress concentration on the support member is alleviated. A sliding portion 127 of one of adjacent support cases 121 of the plurality of support cases 121 connected to each other is slidably housed in the main body portion 122 of the other support case 121. Apart of the sliding portion 127 of the one support case 121 is pulled out from the main
(Continued)

body portion 122 of the other support case 121. Thus, a distance between the one support case 121 and the other support case 121 is increased. At least a part of the sliding portion 127 of the one support case 121 is housed in the main body portion 122 of the other support case 121. Thus, the distance between the one support case 122 and the other support case 122 is decreased.

9 Claims, 9 Drawing Sheets (51) Int. Cl.
*H01M 50/287* (2021.01)
*H01M 50/50* (2021.01)

(56) References Cited

U.S. PATENT DOCUMENTS

| | | |
|---|---|---|
| 2012/0231638 A1 | 9/2012 | Ikeda et al. |
| 2013/0010449 A1 | 1/2013 | Ikeda et al. |
| 2014/0113494 A1* | 4/2014 | Kinoshita ........... H01M 50/503 439/627 |
| 2014/0134894 A1 | 5/2014 | Kinoshita et al. |
| 2017/0033332 A1 | 2/2017 | Sakai et al. |
| 2017/0179460 A1* | 6/2017 | Gotoh ................. H01M 50/298 |
| 2018/0254442 A1* | 9/2018 | Shimizu ................. H01R 11/11 |

FOREIGN PATENT DOCUMENTS

| | | | | |
|---|---|---|---|---|
| CN | 108028344 | A | | 5/2018 |
| CN | 207967151 | U | | 10/2018 |
| JP | 2011124176 | A | * | 6/2011 |
| JP | 2011210711 | A | * | 10/2011 ......... H01M 10/425 |
| JP | 2012227002 | A | * | 11/2012 |
| JP | 2013-016379 | A | | 1/2013 |
| JP | 2013-054940 | A | | 3/2013 |
| JP | 5702947 | B2 | | 4/2015 |
| JP | 2017-059391 | A | | 3/2017 |
| JP | 2017216200 | A | | 12/2017 |

OTHER PUBLICATIONS

International Search Report issued in PCT/JP2019/034514; mailed Nov. 26, 2019.

Yuko Harano, et al., "High voltage Battery Wiring Module, Corresponding to Changes in Number of Battery Cells", SEI Technical Review, Jan. 2015, vol. 186, p. 41-44.

* cited by examiner

SUPPORT MEMBER AND BATTERY MODULE

TECHNICAL FIELD

The present invention relates to a support member and a battery module.

BACKGROUND ART

In a battery mounted on an electric vehicle or the like, a voltage monitoring apparatus is provided to monitor a voltage of the battery. The voltage monitoring apparatus includes a voltage monitoring unit attached to the battery. Then, the voltage monitoring unit includes a flexible printed wiring board. The flexible printed wiring board has a plurality of wires respectively electrically connected to electrodes in the battery. The battery includes a plurality of cells. The plurality of cells are electrically connected by a metal member called a bus bar. The flexible printed wiring board and the bus bar are supported by a cover. The cover is attached to the battery.

There is a manufacturing tolerance in a thickness of the cell. Further, when the battery is assembled by stacking the plurality of cells, an assembly tolerance is generated. Therefore, variations in dimensions of the battery (lengths in a stacking direction of the cells) occur. The variations in the dimensions of the battery increase with a total number of cells stacked. In the related art, the cover is integrated, which may make it difficult to attach the cover to the battery. Further, the cell expands due to heat generated by the cell. Then, after the cover is attached to the battery, stress concentrates on the cover. Then, the cover can be damaged. Furthermore, it is also desired to alleviate stress concentration on the cover when the cover vibrates.

CITATION LIST

Patent Literature

PATENT LITERATURE 1: Japanese Patent No. 5702947

Non-Patent Literature

NON-PATENT LITERATURE: Yuko Hirano, Tomofumi Tsuji, Hisayoshi Yaita. Hiroki Hirai, "High voltage Battery Wiring Module, Corresponding to Changes in Number of Battery Cells", SEI Technical Review, No. 186, pp. 41-44 (January 2015)

SUMMARY OF INVENTION

Problems to be Solved by Invention

An object of the present invention is to provide the support member and the battery module in consideration of the variations in the dimensions of the battery, and to alleviate the stress concentration on the support member.

Solution to the Problems

The present invention employs the following means to solve the above problems.

A support member according to the present invention is a support member that is attached to a battery including a plurality of arrayed cells, including: a plurality of support cases having a mounting portion capable of mounting a conductive member that electrically connects the plurality of cells; a main body portion connected to the mounting portion; and a sliding portion connected to the main body portion. The plurality of support cases is connected to each other, the sliding portion of one of adjacent support cases of the plurality of support cases is slidably housed in the main body portion of the other of the adjacent support cases of the plurality of support cases, when a part of the sliding portion of the one support case is pulled out from the main body portion of the other support case, a distance between the one support case and the other support case is increased, and when at least a part of the sliding portion of the one support case is housed in the main body portion of the other support case, the distance between the one support case and the other support case is decreased.

Further, a battery module according to the present invention includes: a battery including a plurality of arrayed cells; and a support member having a plurality of support cases provided with a mounting portion on which a conductive member that electrically connects the plurality of cells is mounted, a main body portion connected to the mounting portion, and a sliding portion connected to the main body portion, and being attached to the battery. The plurality of support cases is connected to each other, the sliding portion of one of adjacent support cases of the plurality of support cases is slidably housed in the main body portion of the other of the adjacent support cases of the support cases, when a part of the sliding portion of the one support case is pulled out from the main body portion of the other support case, a distance between the one support case and the other support case is increased, and when at least a part of the sliding portion of the one support case is housed in the main body portion of the other support case, the distance between the one support case and the other support case is decreased.

In these inventions, the plurality of support cases is connected to each other. The sliding portion of one of the adjacent support cases of the plurality of support cases is slidably housed in the main body portion of the other of the adjacent support cases of the support cases. A part of the sliding portion of the one support case is pulled out from the main body portion of the other support case. Thus, the distance between the one support case and the other support case is increased. Further, at least a part of the sliding portion of the one support case is housed in the main body portion of the other support case. Thus, the distance between the one support case and the other support case is decreased. The distance between the one support case and the other support case is increased, so that a length of the support member is increased. Then, the distance between the one support case and the other support case is decreased, so that the length of the support member is decreased. In this way, a part of the sliding portion of one support case 121 is pulled out from the main body portion of the other support case, or at least a part of the sliding portion of the one support case is housed in the main body portion of the other support case. Thus, the length of the support member can be adjusted. Therefore, when the support member is attached to the battery, the length of the support member can be adjusted according to the variations in the dimensions of the battery. Therefore, a support member 120 can be attached to the battery in consideration of the variations in the dimensions of the battery. Further, after the support member is attached to the battery, the support member is expanded or contracted when the cell expands or the battery vibrates. This can alleviate the stress concentration on the support member.

In the support member and the battery module according to the present invention, the main body portion and the sliding portion of the plurality of support cases are connected via a hinge, and an angle of the sliding portion with respect to the main body portion of the one support case changes, so that an angle of the other support case with respect to the one support case changes.

This makes it possible to attach the support member to the battery while bending or curving the support member. Therefore, the support member can be easily attached to the battery.

In the support member of the present invention and the battery module of the present invention, the conductive member may be movably mounted on the mounting portion in an arrangement direction of the plurality of support cases.

Thus, the conductive member can be moved in the arrangement direction of the plurality of support cases with the support member being attached to the battery. Therefore, the conductive member can be moved in an arrangement direction of the plurality of cells depending on the manufacturing tolerance in the thickness of each cell.

In the support member of the present invention and the battery module of the present invention, a plurality of the conductive members may be respectively mounted on the support cases.

Thus, the support member can be expanded or contracted by using the support cases on which the conductive members are mounted.

The battery module according to the present invention may include a flexible printed wiring board having a flat portion and a flexible portion, and being supported by the support member. The flexible portion is located directly above the hinge.

This makes it possible to suppress occurrence of a rise on the flat portion of the flexible printed wiring board.

Effects of Invention

According to the present invention, it is possible to alleviate the stress concentration on the support member in the support member and the battery module in consideration of the variations in the dimensions of the battery.

DESCRIPTION OF EMBODIMENTS

Hereinafter, an embodiment for carrying out the present invention will be described in detail exemplarily with reference to the drawings. However, dimensions, materials, shapes, other relative positions and the like of components described in the embodiment are not intended to limit the scope of the present invention to those, unless otherwise specified.

A monitoring device, a battery module, and a support member according to the embodiment will be described with reference to FIGS. 1 to 11.

<Monitoring Device and Battery Module>

Figure 1:
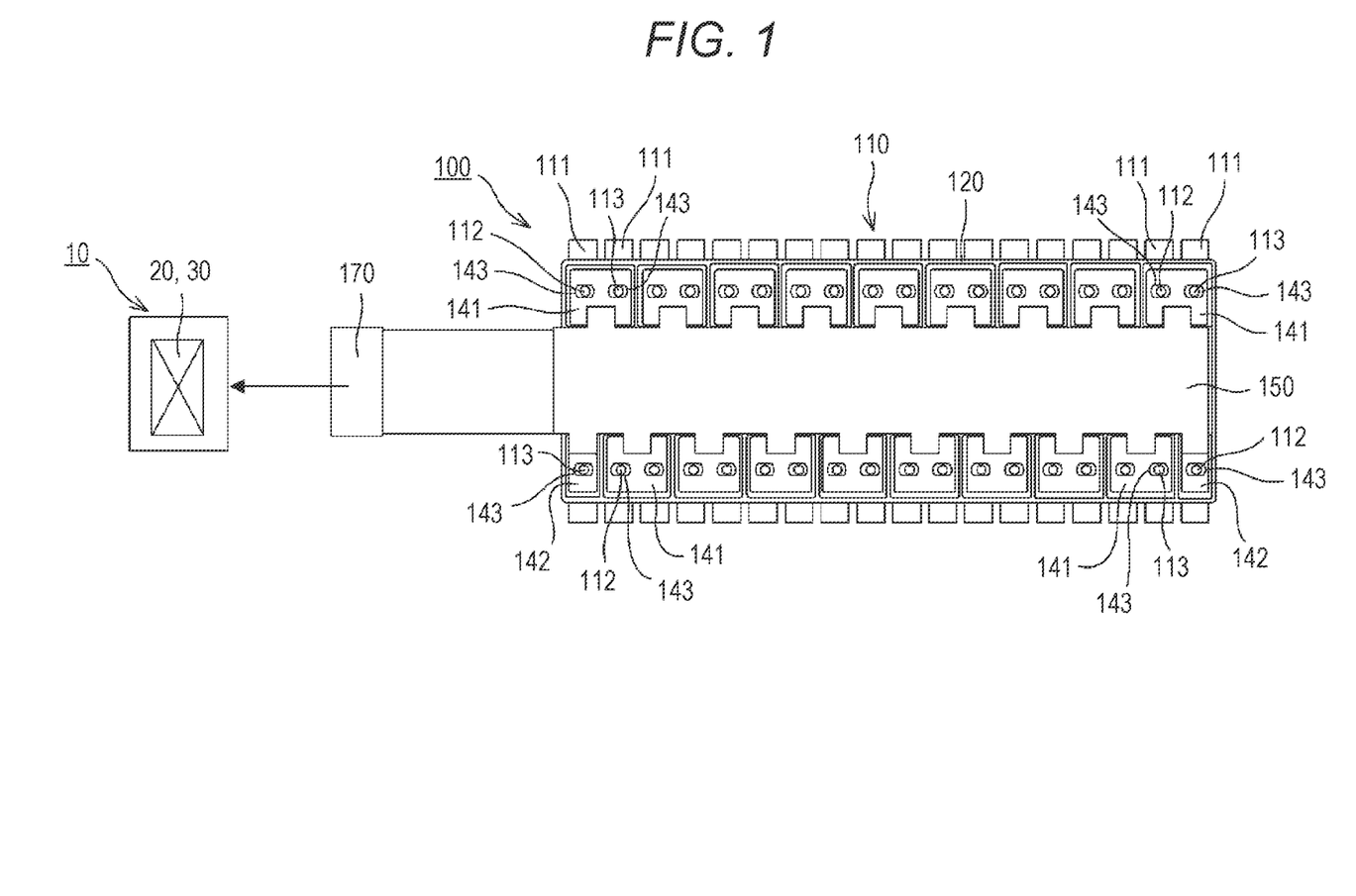
FIG. 1 is a plan view of a voltage device and a battery module according to an embodiment.
Figure 2:
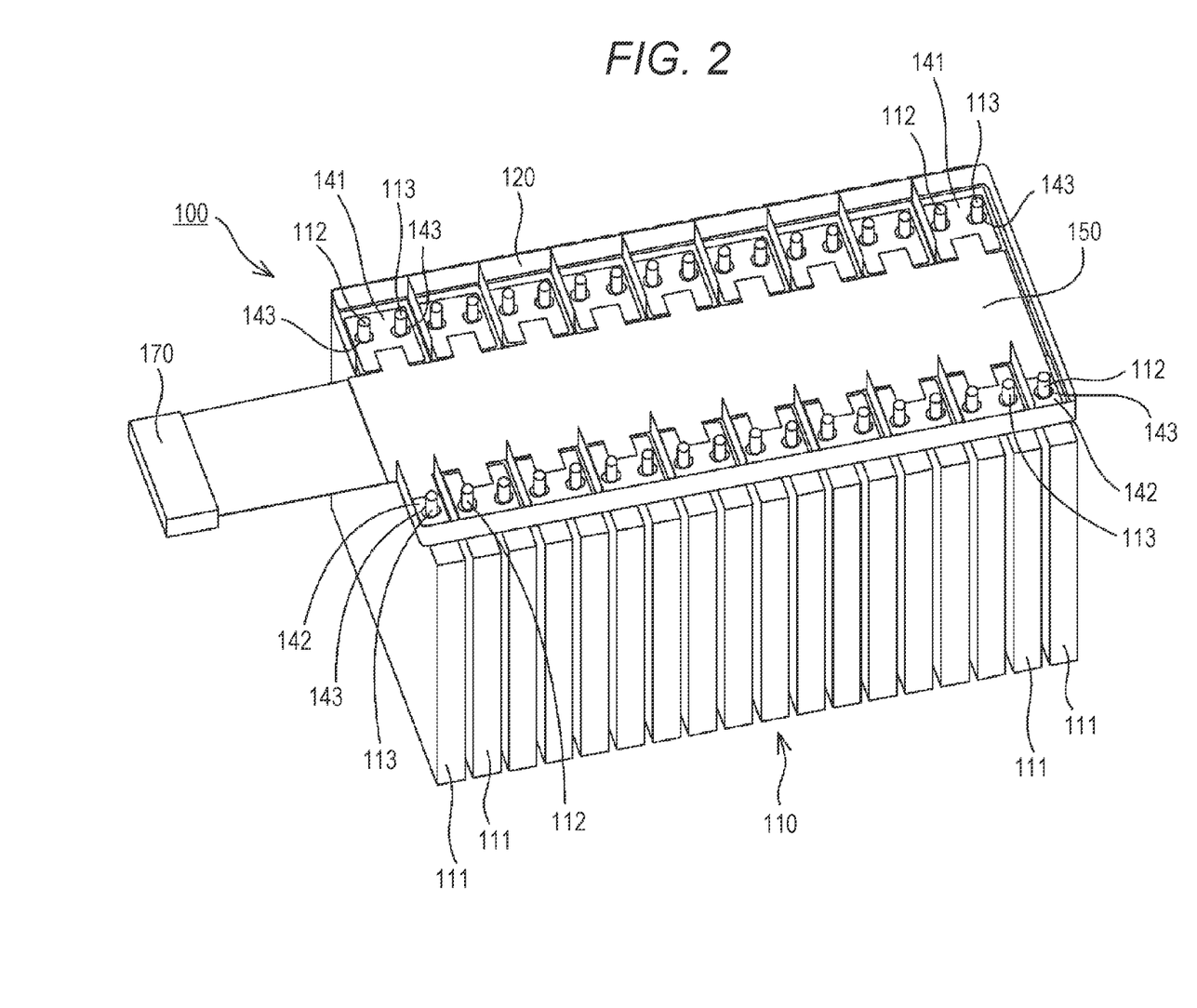
FIG. 2 is a perspective view of the battery module according to the embodiment.
Figure 3:
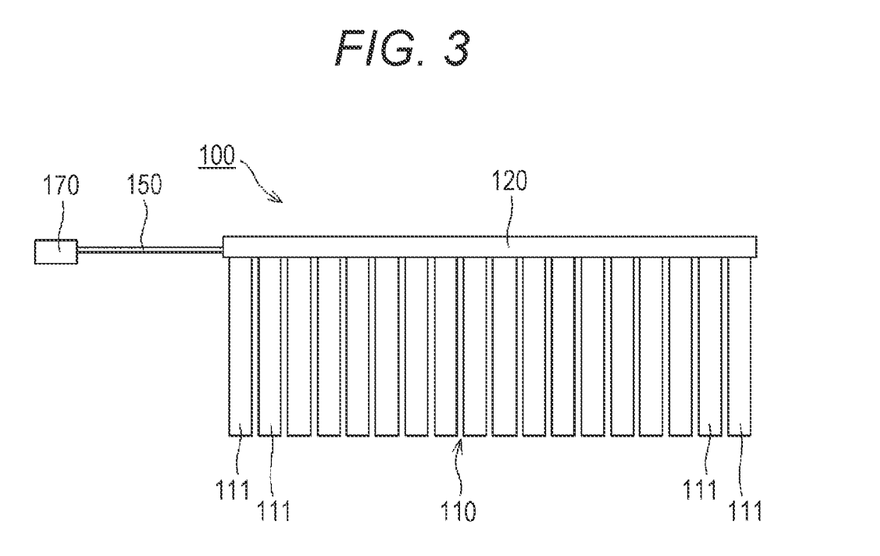
FIG. 3 is a side view of the battery module according to the embodiment.
Figure 4:
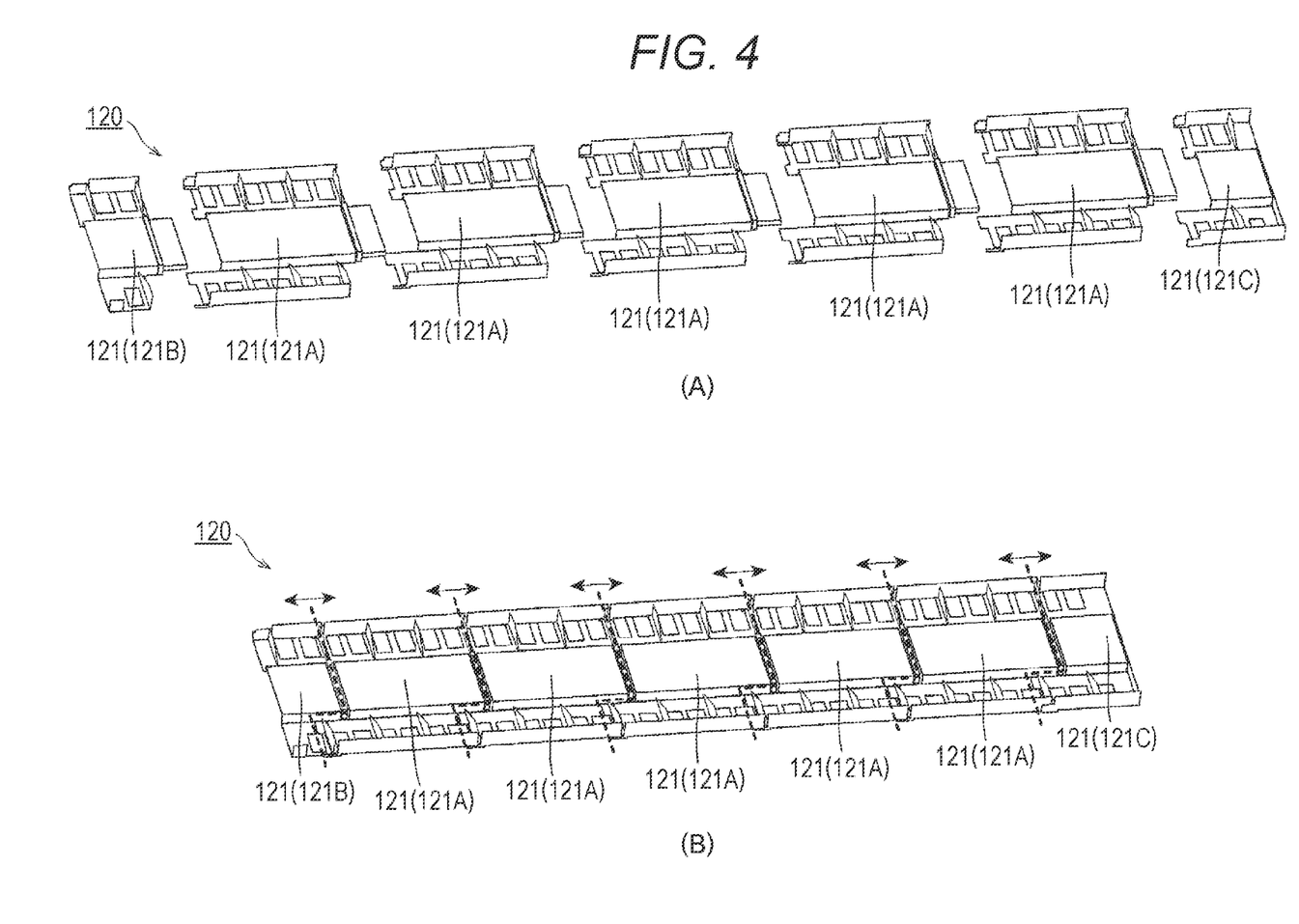
FIGS. 4(A) and 4(B) are perspective views of a support member according to the embodiment.

A monitoring device 10 and a battery module 100 according to the embodiment will be described with reference to FIGS. 1 to 3. FIG. 1 is a plan view of the monitoring device 10 and the battery module 100 according to the embodiment. FIG. 2 is a perspective view illustrating a configuration of the battery module 100 according to the embodiment. FIG. 3 is a side view of the monitoring device 10 and the battery module 100 according to the embodiment. The monitoring device 10 includes a voltage monitoring device main body 20 and a temperature measuring device main body 30. In an example illustrated in FIG. 1, the voltage monitoring device main body 20 and the temperature measuring device main body 30 are integrated. The battery module 100 includes a battery 110, a support member 120, a plurality of bus bars 141 and 142, and a flexible printed circuit board (hereinafter referred to as an FPC) 150. Further, the battery module 100 includes a connector 170 connected to the monitoring device 10. The monitoring device 10 monitors a voltage of the battery 110 and measures a temperature of the battery 110. The support member 120 supports the bus bars 141, 142 and the FPC 150. When the support member 120 is attached to the battery 110, the support member 120 is disposed on the battery 110. The support member 120 has a mounting member for mounting the support member 120 on the battery 110. The battery 110 includes a plurality of cells 111 that is arranged (stacked). In a configuration example of the battery module 100 illustrated in FIGS. 1 to 3, a plurality of cells 111 is arranged side by side in a direction perpendicular to a longitudinal direction of the cells 111 (hereinafter, referred to as an arrangement direction of the cells 111).

Each of the plurality of cells 111 includes a positive electrode terminal 112 and a negative electrode terminal 113. The positive electrode terminal 112 and the negative electrode terminal 113 have a bolt shape and project from an upper surface of the cell 111. In adjacent cells 111, the positive electrode terminal 112 of one cell 111 and the negative electrode terminal 113 of the other cell 111 are arranged in the arrangement direction of the cells 111. Therefore, in the battery 110, a plurality of the positive electrode terminals 112 and a plurality of the negative electrode terminals 113 are alternately arranged in the arrangement direction of the cells 111. The positive electrode terminal 112 and the negative electrode terminal 113 of the adjacent cells 111 are electrically connected by the bus bar 141. Therefore, the plurality of cells 111 is configured to be connected in series by the adjacent positive electrode terminal 112 and the negative electrode terminal 113 being electrically connected by the bus bar 141. The bus bars 141 and 142 are conductive members. An example of the conductive member is a plate metal. The number of cells 111 is not limited to the configuration example of the battery module 100 illustrated in FIGS. 1 to 3. For example, the number of cells 111 may be determined according to an output voltage of the battery 110. The bass bars 141 and 142 have elongated holes 143. When the bus bars 141 and 142 are attached to the battery 110, the positive electrode terminal 112 and the negative electrode terminal 113 are inserted into the elongated holes 143 of the bus bars 141 and 142.

They are not limited to the elongated holes 143, and the bus bars 141 and 142 may have round holes. The positive electrode terminal 112 and the negative electrode terminal 113 may be inserted into the round holes of the bus bars 141 and 142.

The FPC 150 includes a flexible film and a plurality of wires. The plurality of wires is made of, for example, copper foil. A part of the plurality of wires may be used for voltage monitoring wiring. Alternatively, the other part of the plurality of wires may be used for temperature measurement wiring. In this case, the voltage monitoring wiring and the temperature measurement wiring are connected to the connector 170.

<Support Member>

The support member 120 according to the embodiment will be described with reference to FIGS. 4(A) and 4(B). FIGS. 4(A) and 4(B) are perspective views of the support member 120 according to the embodiment. The support member 120 includes a plurality of support cases (housings) 121. The plurality of support cases 121 is connected to each other. Thus, the plurality of support cases 121 can be connected. FIG. 4A illustrates a state of the plurality of support cases 121 before they are connected. FIG. 4B illustrates the state of the plurality of support cases 121 after they are connected. As illustrated in FIGS. 4A and 4B, the plurality of support cases 121A has the same shape. A shape of the support case 121B is different from that of a support case 121A and that of a support case 121C. The shape of the support case 121C is different from that of the support case 121A and that of the support case 121B.

Figure 5:
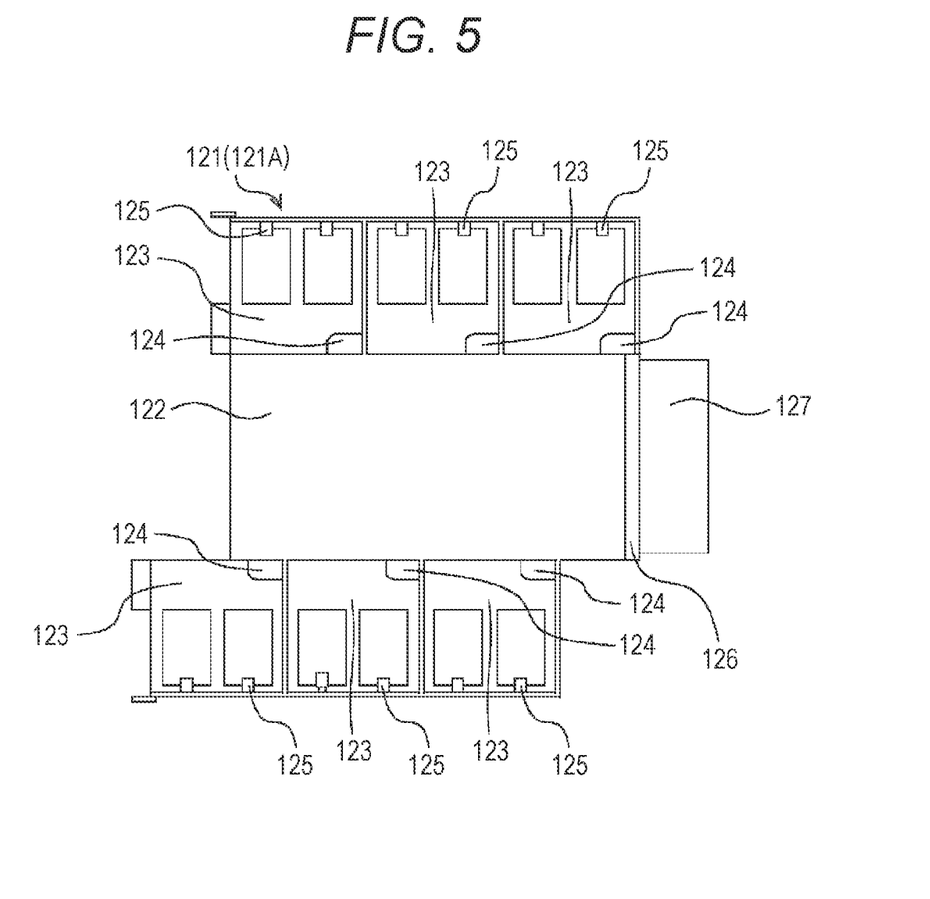
FIG. 5 is a plan view of a support case according to the embodiment.
Figure 6:
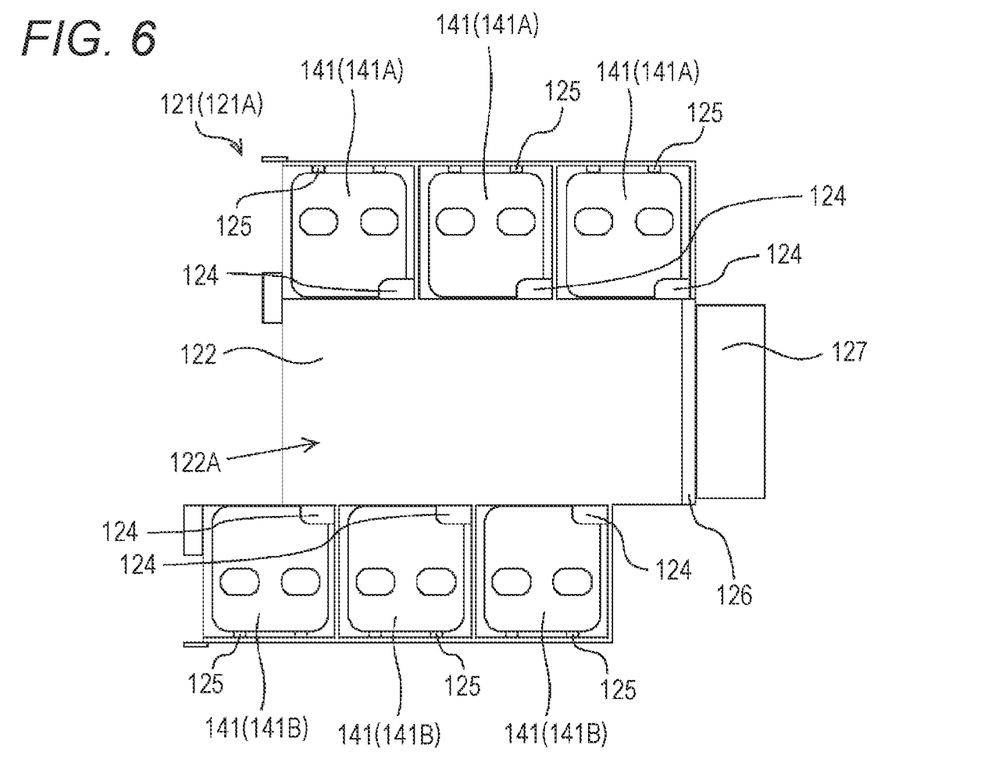
FIG. 6 is a plan view of the support case according to the embodiment.

The support case 121 according to the embodiment will be described with reference to FIGS. 5 and 6. FIGS. 5 and 6 are plan views of the support case 121A according to the embodiment. The plurality of bus bars 141 is mounted on the support case 121A. The plurality of bus bars 141 is supported by the support case 121A. The support case 121A has a main body portion 122 and a plurality of mounting portions 123 connected to the main body portion 122. One bus bar 141 can be mounted on each of the plurality of mounting portions 123. FIG. 5 illustrates a state before the plurality of bus bars 141 is mounted on the support case 121A. FIG. 6 illustrates a state after the plurality of bus bars 141 is mounted on the support case 121A. Further, the support case 121A may have the main body portion 122 and one mounting portion 123 connected to the main body portion 122. In this case, the plurality of bus bars 141 may be mounted on the one mounting portion 123. The support cases 121B and 121B have the main body portion 122 and the mounting portions 123 connected to the main body portion 122, like the support case 121A. Like the support case 121A, the plurality of bus bars 141 is mounted on the support cases 121B and 121C. One bus bar 142 is mounted on each of the support cases 121B and 121C. Further, the support cases 121B and 121C may have the main body portion 122 and one mounting portion 123 connected to the main body portion 122. In this case, the plurality of bus bars 141 and the one bus bar 142 may be mounted on the one mounting portion 123.

As illustrated in FIG. 6, six bus bars 141 are mounted on one support case 121A. However, the number of bus bars 141 mounted on the support case 121A is not limited. At least two bus bars 141 are mounted on the support case 121A. In a configuration example illustrated in FIG. 6, three bus bars 141A are mounted on the support case 121A so as to be arranged in succession. Then, three bus bars 141B are mounted on the support case 121A so as to be arranged in succession. The main body 122 is arranged to be sandwiched between the three bus bars 141A and the three bus bars 141B when viewed from a normal direction of an upper surface 122A of the main body 122. In this way, a part of the plurality of bus bars 141 mounted on the support case 121A and the other part are arranged with the main body portion 122 interposed therebetween. A holding portion 124 and a pressing portion 125 are provided in the mounting portion 123. When the bus bar 141 is mounted on the mounting portion 123, the holding portion 124 comes into contact with an upper surface of the bus bar 141. Then, the pressing portion 125 comes into contact with a side surface and a lower surface of the bus bar 141. The pressing portion 125 has flexibility. The pressing portion 125 presses the bus bar 141 toward the main body portion 122 and the holding portion 124 to the extent that the bus bar 141 can move. In this way, the bus bar 141 is mounted on the mounting portion 123 so that the bus bar 141 can move in a parallel direction. Like the bus bar 141, the bus bar 142 is mounted on the mounting portion 123 so that the bus bar 142 can move in the parallel direction. When the plurality of support cases 121 is connected, the bus bars 141 and 142 are mounted on the support case 121 so as to be movable in an arrangement direction of the plurality of support cases 121. Further, when the support member 120 is attached to the battery 110, the bus bars 141 and 142 can be moved toward the arrangement direction of the cells 111 with the support member 120 being attached to the battery 110.

Figure 7:
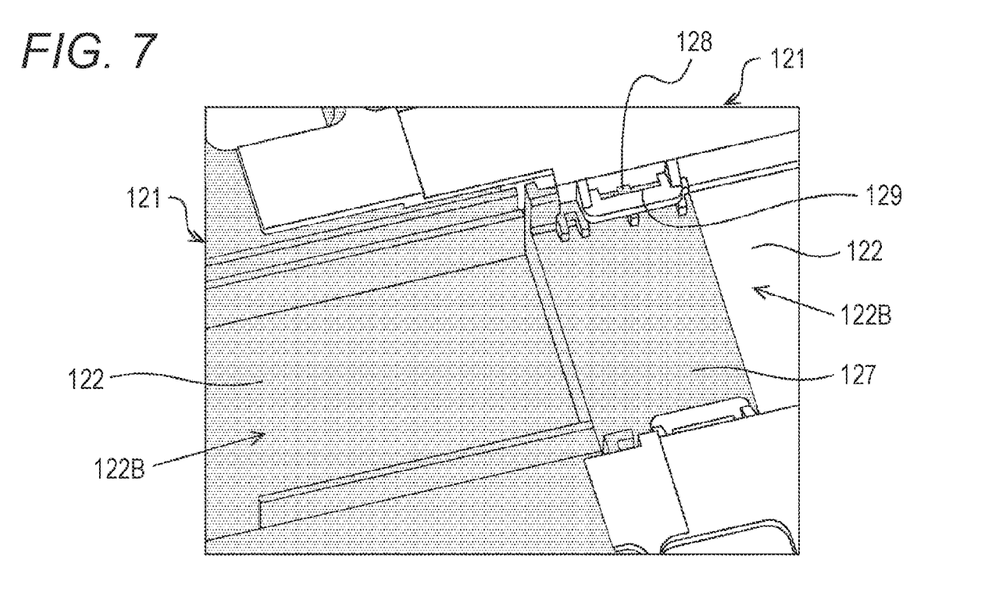
FIG. 7 is a perspective view of the support member according to the embodiment.

The support case 121 has a hinge 126 and a sliding portion 127. The sliding portion 127 is connected to the main body portion 122 via the hinge 126. The support cases 121 are connected to each other. The sliding portion 127 of one of the adjacent support cases 121 of the support cases 121 is slidably housed in the main body portion 122 of the other of the adjacent support cases 121 of the support cases 121. FIG. 7 is a perspective view of the support member 120 as viewed from the lower surface 122B side of the main body portion 122 of the support case 121 when the support cases 121 are connected to each other. As illustrated in FIG. 7, the sliding portion 127 of one support case 121 (support case 121 on the left side of FIG. 7) is housed in the main body portion 122 of the other support case 121 (support case 121 on the right side of FIG. 7). When the sliding portion 127 of the one support case 121 is housed in the main body portion 122 of the other support case 121, a protrusion 128 formed on the sliding portion 127 of the one support case 121 is fitted into an elongated hole 129 formed in the lower surface 122B of the main body portion 122 of the other support case 121. In this way, the protrusion 128 of the one support case 121 is fitted into the elongated hole 129 of the other support case 121. Thus, a state in which the support cases 121 are connected to each other (hereinafter referred to as a connected state) is maintained.

Figure 8:
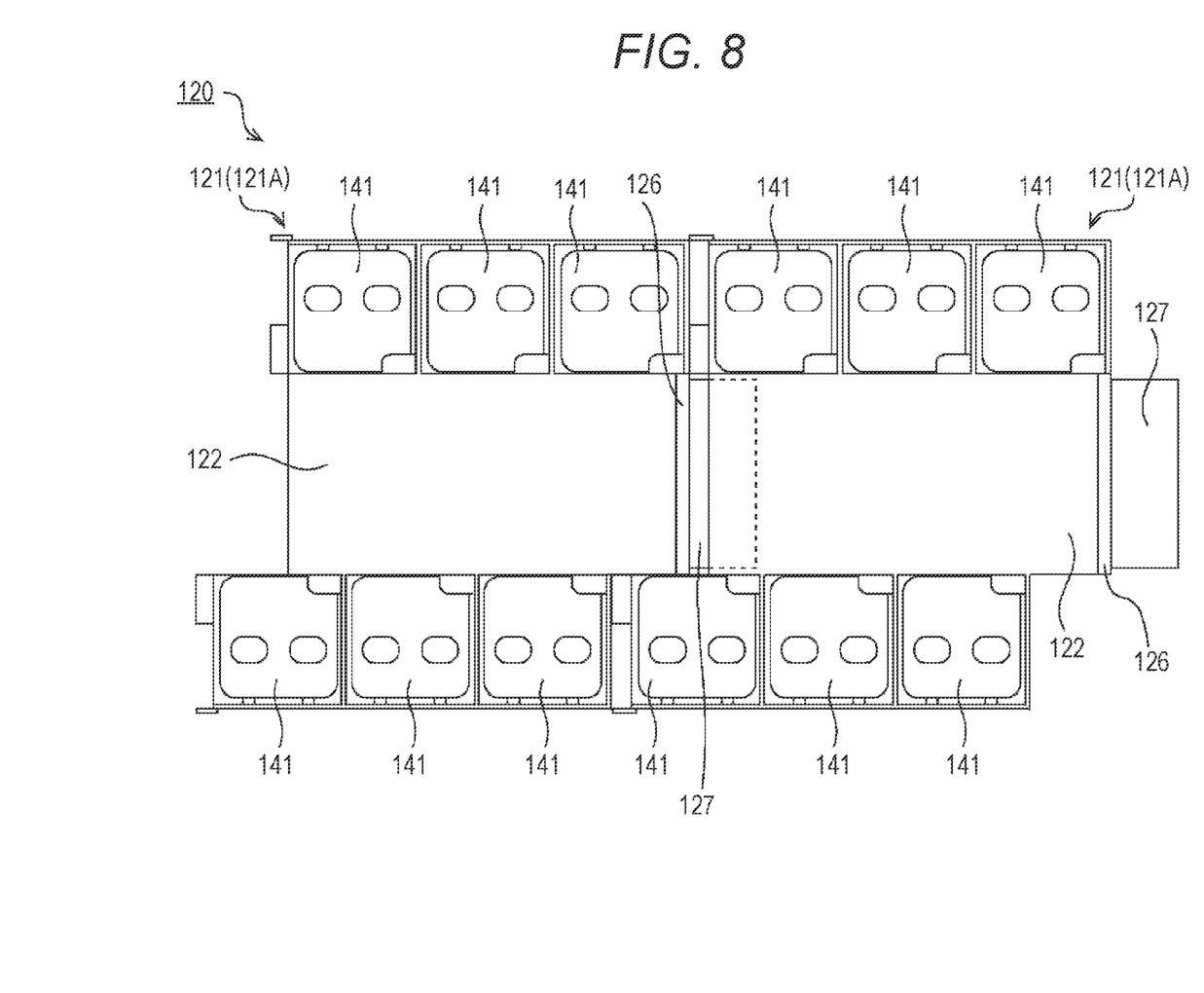
FIG. 8 is a plan view of the support member according to the embodiment.
Figure 9:
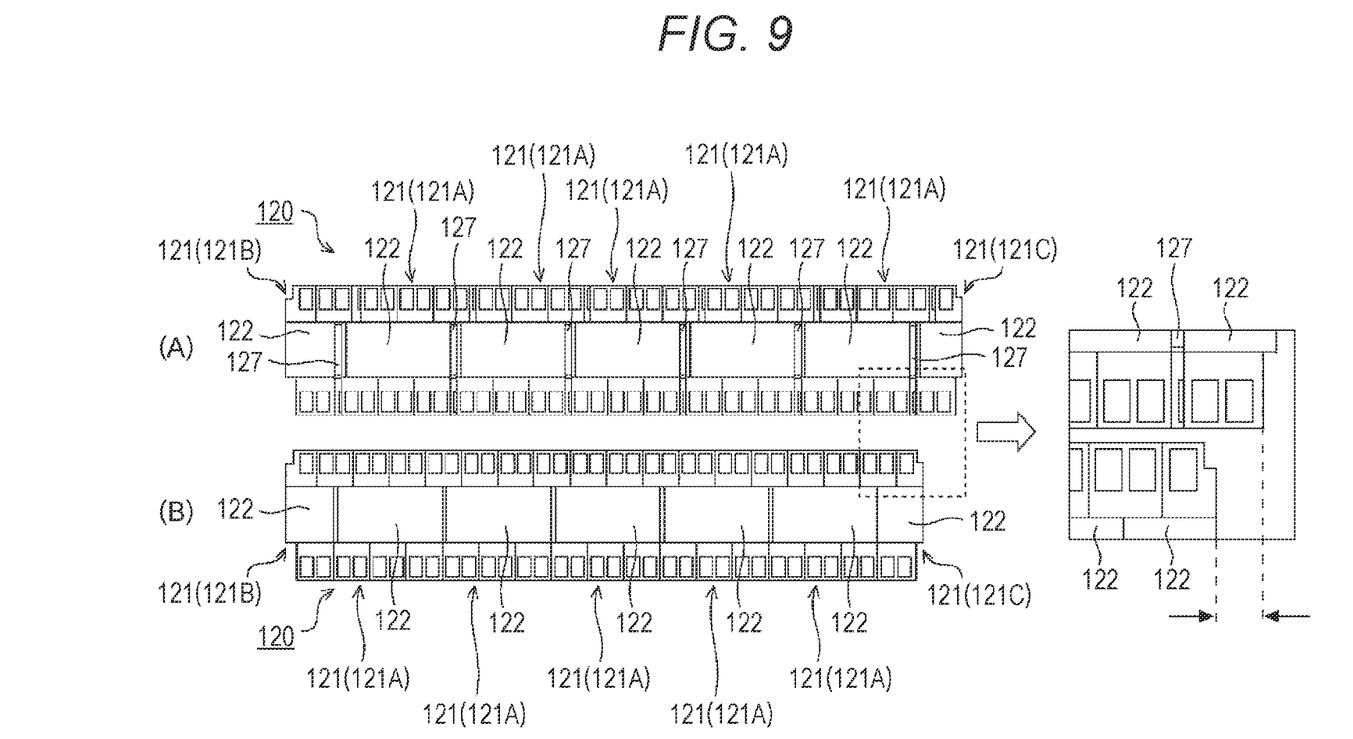
FIGS. 9(A) and 9(B) are plan views of the support member according to the embodiment.

In the connected state, the one support case 121 is pulled away from the other support case 121. Then, the protrusion 128 of the one support case 121 slides in the elongated hole 129 of the other support case 121 and comes into contact with an inner peripheral surface of the elongated hole 129. In this case, the sliding portion 127 of the one support case 121 slides in the main body portion 122 of the other support case 121. Then, the one support case 121 is in a state in which a part of the sliding portion 127 is pulled out from the main body portion 122 of the other support case 121. FIG. 8 is a plan view of the support member 120 according to the embodiment. As illustrated in FIG. 8, in the connected state, the one support case 121 (support case 121 on the left side of FIG. 8) is pulled away from the other support case 121 (support case 121 on the right side of FIG. 8). Then, a part of the sliding portion 127 of the one support case 121 is pulled out from the main body portion 122 of the other support case 121. Thus, an interval (a distance) between the one support case 121 and the other support case 121 is increased. As a result, a length of the support member 120 is longer than that in a state in which all of the sliding portion 127 of the one support case 121 is housed in the main body portion 122 of the other support case 121. The length of the support member 120 is increased by a length of a part of the sliding portion 127 of the one support case 121 pulled out from the main body portion 122 of the other support case 121. Further, in a state in which a part of the sliding portion 127 of the one support case 121 is pulled out from the main body portion 122 of the other support case 121, at least a part of the sliding portion 127 of the one support case 121 can also be housed in the main body 122 of the other support case 121. In this case, the interval (the distance) between the one support case 121 and the other support case 121 is decreased. As a result, the length of the support member 120 is shorter than that in a state in which a part of the sliding portion 127 of the one support case 121 is pulled out from the main body portion 122 of the other support case 121.

FIGS. 9(A) and 9(B) are plan views of the support member 120 according to the embodiment. FIG. 9(A) illustrates a support member 120 in which a part of the sliding portion 127 of the one support case 121 is pulled out from the main body portion 122 of the other support case 121. FIG. 9(B) illustrates the support member 120 in which all of the sliding portion 127 of the one support case 121 is housed in the main body portion 122 of the other support case 121. The length of the support member 120 illustrated in FIG. 9(A) is longer than that of the support member 120 illustrated in FIG. 9(B). In this way, a part of the sliding portion 127 of the one support case 121 is pulled out from the main body portion 122 of the other support case 121, or all or part of the sliding portion 127 of the one support case 121 is housed in the main body portion 122 of the other support case 121, so that the length of the support member 120 can be adjusted. Therefore, the support member 120 is expanded or contracted in a longitudinal direction of the support member 120. The support cases 121B and 121C also have the same configuration as the support case 121A. It is possible to house all or part of the sliding portion 127 of the support case 121B in the main body portion 122 of the support case 121A. Further, a part of the sliding portion 127 of the support case 121B can be pulled out from the main body portion 122 of the support case 121A. It is possible to house all or part of the sliding portion 127 of the support case 121A in the main body portion 122 of the support case 121C. Further, a part of the sliding portion 127 of the support case 121A can be pulled out from the main body portion 122 of the support case 121C.

In a longitudinal direction of the battery 110, that is, in the arrangement direction (stacking direction) of the cells 111, the dimensions of the battery 110 vary. In the battery module 100, when the support member 120 is attached to the battery 110, the length of the support member 120 can be adjusted according to variations in the dimensions of the battery 110. Therefore, the support member 120 can be attached to the battery 110 in consideration of the variations in the dimensions of the battery 110. That is, when the support member 120 is attached to the battery 110, the support member 120 can be expanded and contracted to absorb the variations in the dimensions of the battery 110. Further, when the cell 111 expands or the battery 110 vibrates after the support member 120 is attached to the battery 110, the support member 120 can be expanded or contracted to alleviate the stress concentration on the support member 120.

The bus bars 141 and 142 are mounted on the support member 120 so that they can move in the parallel direction. Therefore, the bus bars 141 and 142 are movably mounted on the mounting portion 123 in an arrangement direction of the support cases 121. When the support member 120 is attached to the battery 110, the bus bars 141 and 142 can be moved in the arrangement direction of the cells 111 with the support member 120 being attached to the battery 110. Therefore, when the support member 120 is attached to the battery 110 and then the bus bars 141 and 142 are attached to the battery 110, the bus bars 141 and 142 can be moved in the arrangement direction of the cells 111 according to a manufacturing tolerance in a thickness of each cell 111. Therefore, the bus bars 141 and 142 can be attached to the battery 110 in consideration of the manufacturing tolerance in the thickness of each cell 111. In this way, according to the battery module 100, it is possible to absorb the manufacturing tolerance in the thickness of each cell 111. Further, since the bus bars 141 and 142 are not fixed to the support member 120, it is possible to alleviate the stress concentration on the support member 120 when the cell 111 expands or the battery 110 vibrates.

Figure 10:
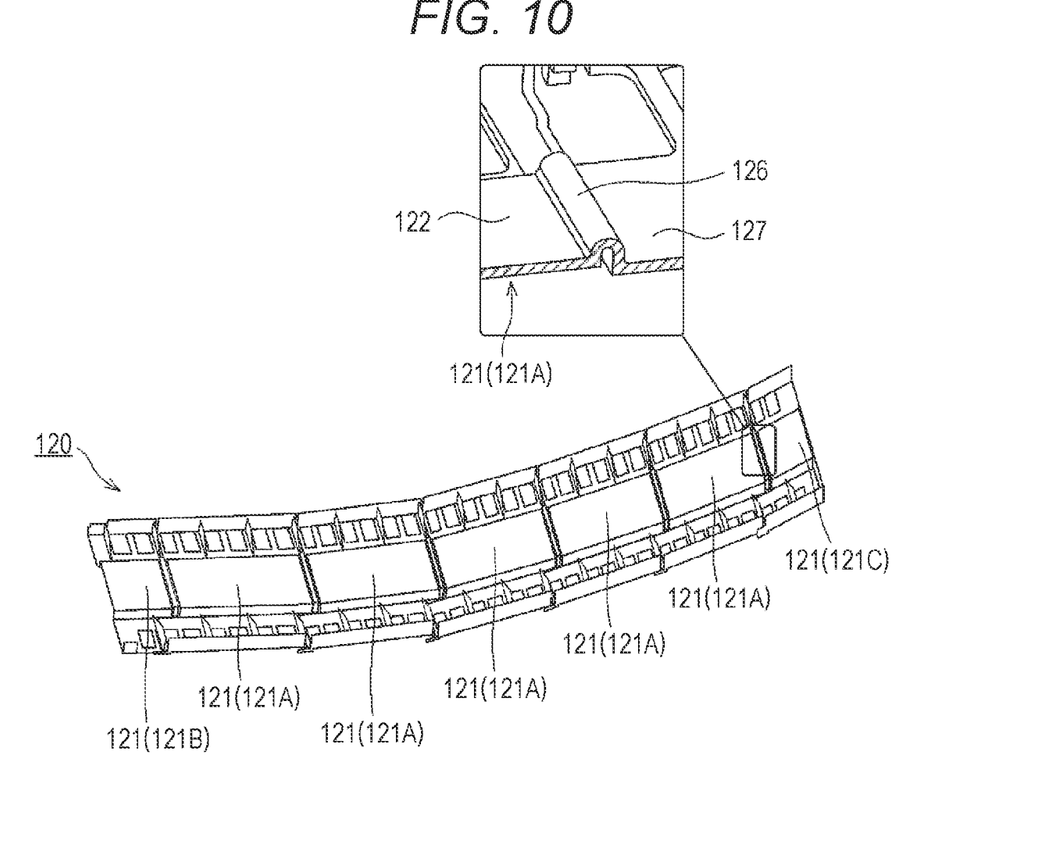
FIG. 10 is a perspective view of the support member according to the embodiment.

FIG. 10 is a perspective view of the support member 120 according to the embodiment. As illustrated in FIG. 10, the hinge 126 having flexibility is provided between the main body portion 122 and the sliding portion 127 of the support case 121. The hinge 126 connects the main body portion 122 and the sliding portion 127. When an external force is applied to the main body portion 122 or the sliding portion 127, the hinge 126 is bent. Thus, an angle of the sliding portion 127 with respect to the main body portion 122 changes. When the sliding portion 127 of the one support case 121 is housed in the main body portion 122 of the other support case 121, and the external force is applied to the one support case 121 or the other support case 121, an angle of the other support case 121 with respect to the one support case 121 changes. Thus, the support member 120 can be attached to the battery 110 while bending or curving the support member 120, so that the support member 120 can be easily attached to the battery 110. Therefore, a time required to attach the support member 120 to the battery 110 can be reduced. Further, when the cell 111 expands or the battery 110 vibrates, the support member 120 is bent or curved, so that the stress concentration on the support member 120 can be alleviated.

Figure 11:
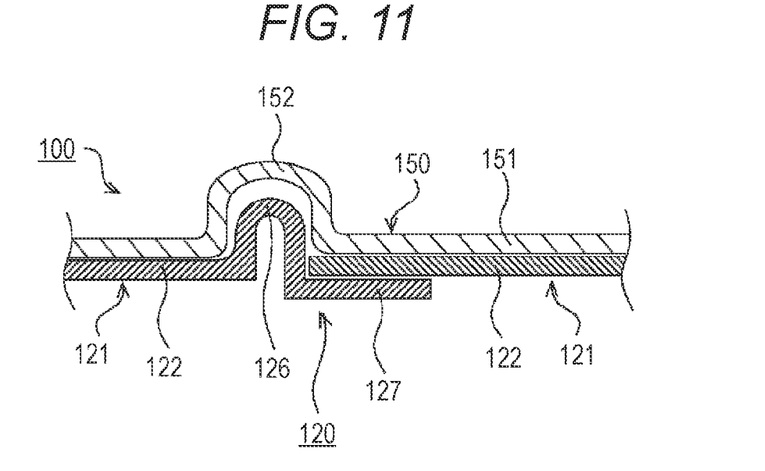
FIG. 11 is a cross-sectional view of the battery module according to the embodiment.

FIG. 11 is a cross-sectional view of the battery module 100 according to the embodiment. FIG. 11 illustrates a part of a cross-section of the battery module 100. As illustrated in FIG. 11, a partially curved FPC 150 may be placed on the support member 120. The FPC 150 has a flat portion 151 and a flexible portion 152. The flexible portion 152 of the FPC 150 is bent with respect to the flat portion 151 of the FPC 150. When the support member 120 is extended, bending of the flexible portion 152 of the FPC 150 is reduced. Thus, the FPC 150 can follow the extension of the support member 120. Therefore, even when the support member 120 is extended, a size of the FPC 150 matches a size of the support member 120. Further, the FPC 150 may be placed on the support member 120 so that the flexible portion 152 of the FPC 150 is located directly above the hinge 126 of the support member 120. The hinge 126 projects upward from the main body portion 122. Therefore, when the flat portion 151 of the FPC 150 is located directly above the hinge 126 of the support member 120, the flat portion 151 of the FPC 150 may rise. The flexible portion 152 of the FPC 150 is located directly above the hinge 126 of the support member 120, so that it is possible to suppress occurrence of a rise on the flat portion 151 of the FPC 150.

LIST OF REFERENCE NUMERALS

10: monitoring device, 20: voltage monitoring device main body, 30: temperature measuring device main body, 100: battery module, 110: battery, 111: cell, 112: positive electrode terminal, 113: negative electrode terminal, 120: support member, 121, 121A, 121B, 121C: support case, 122: main body portion, 123: mounting portion, 124: holding portion, 125: pressing portion, 126: hinge, 127: sliding portion, 128: protrusion, 129, 143: elongated hole, 141, 141A, 141B, 142: bus bar, 150: FPC, 151: flat portion, 152: flexible portion, 170: connector.

The invention claimed is:

1. A support member that is attached to a battery including a plurality of arrayed cells, comprising
a plurality of support cases, each support case of the plurality of support cases including a mounting portion capable of mounting a conductive member that electrically connects the cells, a main body portion connected to the mounting portion, and a sliding portion connected to the main body portion, wherein
the support cases are connected to each other,
the sliding portion of one support case of adjacent support cases of the support cases is slidably housed in the main body portion of an other support case of the adjacent support cases of the support cases,
when a part of the sliding portion of the one support case is pulled out from the main body portion of the other support case, a distance between the one support case and the other support case is increased,
when at least a part of the sliding portion of the one support case is slid into the main body portion of the other support case, the distance between the one support case and the other support case is decreased,
the sliding portion of the one support case comprises a protrusion fitted into a hole in the main body portion of the other support case, wherein the hole has a length along a sliding direction of the support cases that is greater than a width of the hole,
the hole includes a pair of first inner peripheral surfaces that extend along the sliding direction and face each other, and a pair of second inner peripheral surfaces that extend along the width direction and face each other, the pair of first inner peripheral surfaces and the pair of second inner peripheral surfaces collectively form a closed inner peripheral surface of the hole,
each of the first inner peripheral surfaces includes a flat surface configured to permit reversible sliding movement of the protrusion in which the distance between the one support case and the other support case is increased and decreased, and
the reversible sliding movement of the protrusion is confined by contact between the protrusion and one or the other of the pair of second inner peripheral surfaces.

2. The support member according to claim 1, wherein
the main body portion and the sliding portion of the support cases are connected via a hinge, and
an angle of the sliding portion with respect to the main body portion of the one support case is configured to change so that an angle of the other support case with respect to the one support case is configured to change.

3. The support member according to claim 1, wherein the conductive member is movably mounted on the mounting portion in an arrangement direction of the plurality of support cases.

4. The support member according to claim 1, wherein each of the plurality of support cases is configured to mount a plurality of the conductive members.

5. A battery module comprising:
a battery including a plurality of arrayed cells; and
a support member attached to the battery and having a plurality of support cases, each support case of the plurality of support cases including a mounting portion on which a conductive member that electrically connects the cells is mounted, a main body portion connected to the mounting portion, and a sliding portion connected to the main body portion, wherein
the support cases are connected to each other,
the sliding portion of one support case of adjacent support cases of the support cases is slidably housed in the main body portion of an other support case of the adjacent support cases of the support cases,
when a part of the sliding portion of the one support case is pulled out from the main body portion of the other support case, a distance between the one support case and the other support case is increased,
when at least a part of the sliding portion of the one support case is slid into the main body portion of the other support case, the distance between the one support case and the other support case is decreased,
the sliding portion of the one support case comprises a protrusion fitted into a hole in the main body portion of the other support case, wherein the hole has a length along a sliding direction of the support cases that is greater than a width of the hole,
the hole includes a pair of first inner peripheral surfaces that extend along the sliding direction and face each other, and a pair of second inner peripheral surfaces that extend along the width direction and face each other, the pair of first inner peripheral surfaces and the pair of second inner peripheral surfaces collectively form a closed inner peripheral surface of the hole,
each of the first inner peripheral surfaces includes a flat surface configured to permit reversible sliding movement of the protrusion in which the distance between the one support case and the other support case is increased and decreased, and
the reversible sliding movement of the protrusion is confined by contact between the protrusion and one or the other of the pair of second inner peripheral surfaces.

6. The battery module according to claim 5, wherein
the main body portion and the sliding portion of the plurality of support cases are connected via a hinge, and
an angle of the sliding portion with respect to the main body portion of the one support case is configured to change so that an angle of the other support case with respect to the one support case is configured to change.

7. The battery module according to claim 6, comprising
a flexible printed wiring board having a flexible portion and being supported by the support member, wherein the flexible portion is located directly above the hinge.

8. The battery module according to claim 5, wherein the conductive member is movably mounted on the mounting portion in an arrangement direction of the plurality of support cases.

9. The battery module according to claim 5, wherein each of the plurality of support cases mounts a plurality of the conductive members.

\* \* \* \* \*